Oct. 24, 1967 G. E. ICE 3,349,348
TEMPERATURE-COMPENSATED CIRCUIT ARRANGEMENT
Filed Jan. 10, 1963 3 Sheets-Sheet 1

INVENTOR.
George E. Ice
BY
C. A. Gulbrandsen
ATTY.

TEMPERATURE-COMPENSATED CIRCUIT ARRANGEMENT

Filed Jan. 10, 1963

INVENTOR.
George E. Ice

BY C. A. Gulbrandsen
ATTY.

Oct. 24, 1967 G. E. ICE 3,349,348

TEMPERATURE-COMPENSATED CIRCUIT ARRANGEMENT

Filed Jan. 10, 1963 3 Sheets-Sheet 3

INVENTOR.
George E. Ice

BY

C. A. Gulbrandsen

ATTY.

United States Patent Office
3,349,348
Patented Oct. 24, 1967

3,349,348
TEMPERATURE-COMPENSATED CIRCUIT ARRANGEMENT

George Emery Ice, Redwood City, Calif., assignor, by mesne assignments, to Automatic Electric Laboratories, Inc., Northlake, Ill., a corporation of Delaware Filed Jan. 10, 1963, Ser. No. 250,539
5 Claims. (Cl. 333—72)

This invention relates to a temperature-compensated circuit arrangement, and more particularly to an arrangement for the temperature-stabilization of the insertion loss of quartz crystal filters.

In the past, a major factor which affected the insertion loss of a quartz crystal filter was the change of effective crystal resistance of the quartz crystal. However, the variation in insertion loss was disregarded. The standard method of crystal filter design ignores the changes in crystal resistance that occurs due to changes in temperature. For a temperature range of approximately −25° C. to 70° C., the resistance of a quartz crystal increases from two or three times in value. However, one arrangement previously used to compensate for insertion loss variations in crystal filters was to connect a negative temperature coefficient resistance (a thermistor and resistor in parallel) in series with the source impedance so that the negative temperature coefficient resistance is on the source or input side and the crystal is on the output side of the source-coupling transformer. This type of compensation, however, suffers from certain fundamental drawbacks; the effective source impedance varies with temperature, thereby creating an impedance mismatch and causing ripples in the pass band of the filter. Another drawback is the variation in source output level. Furthermore, the control of insertion loss is operative only over a limited temperature range.

The principal object of this invention is, therefore, a provision of an arrangement to temperature-stabilize the insertion loss of quartz-crystal filters.

According to the invention, a temperature-compensated circuit arrangement is provided which controls the resistance of the crystal, and therefore, the insertion loss is controlled within close limits over a wide temperature range. A thermistor in parallel with a resistor is connected in series with the crystal. An increase in temperature causes the crystal resistance to increase; at the same time, the effective thermistor resistance decreases. If the proper combination of crystal, thermistor and parallel resistor is chosen, the net result is the stabilization of effective resistance of the combination with respect to temperature.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–7 wherein.

FIGS. 6A, 6B, 7A, and 7B are graphs that are useful in explaining the invention.

Figure 1:
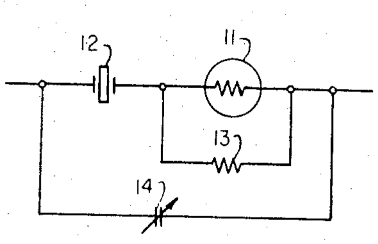
FIG. 1 is a schematic diagram of a temperature-compensated circuit arrangement.

Referring to FIG. 1, variations in insertion loss are greatly reduced by the use of thermistor compensation networks in series with each crystal of a filter. The resistance of a quartz crystal increases with increasing temperature. This variation in resistance affects the Q of the crystal with the result that the filter insertion loss increases with an increase in operating temperature. Therefore, advantage is taken of the negative temperature coefficient of a thermistor by connecting thermistor 11 in series with crystal 12. Resistor 13 is placed in parallel with thermistor 11 to decrease the additional resistance which is introduced to the filter by the presence of thermistor 11. If a thermistor with sufficiently low resistance were available, then the parallel resistor 13 would not be necessary.

During normal operation, the ambient temperature varies which causes a variation in the temperature of crystal 12 and thermistor 11. An increase in temperature causes the resistance of crystal 12 to increase. At the same time, the resistance of thermistor 11 decreases. If the proper combination of crystal 12, thermistor 11, and parallel resistor 13 is made, the net result is the stabilization of the effective resistance of the combination, where the effective resistance is the total resistance of the combination of thermistor 11, crystal 12, and resistor 13. Therefore, the insertion loss of the filter is maintained at a constant value over a wide temperature range. Capacitor 14 is utilized as a means for tuning the crystal.

Figure 2:
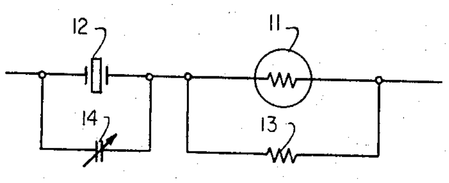
FIGS. 2 and 3 are schematic diagrams of alternative filter arrangements.
Figure 3:
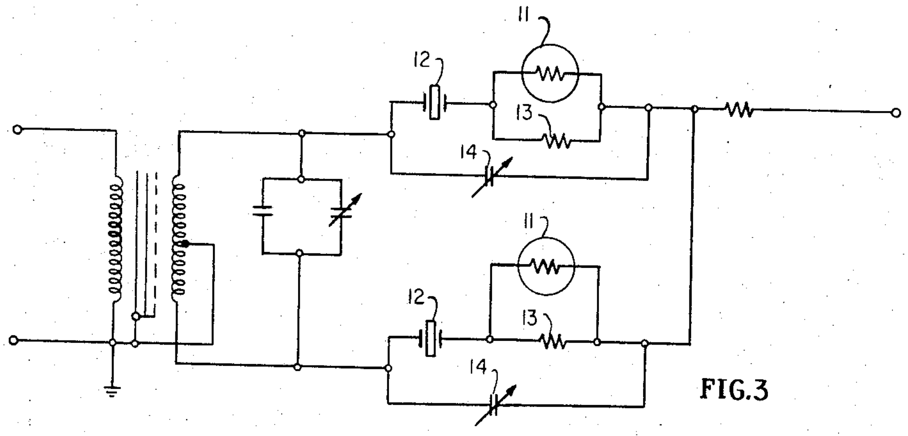

Different filter arrangements are shown in FIGS. 2 and 3. This means of resistance temperature compensation may also be used to keep the amplitudes of oscillation constant over wide ranges of temperature for crystal oscillator circuits.

Figure 4:
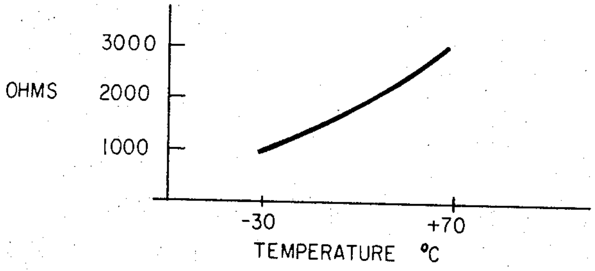
FIG. 4 is a graph of a typical crystal resistance versus temperature.

The parameters of thermistor 11 and the value of parallel resistor 13 must be properly chosen in order to compensate crystal 12. The crystal resistance typically changes by a factor of 3:1 over the temperature range of −30° C. to +70° C. as shown in FIG. 4 which is a graph of typical crystal resistance versus temperature. All of the crystal cuts which are commonly used in filters behave in a similar manner, and it can be clearly seen that the first and second derivatives of the curve are positive. Nonlinearity of the curves is usually not pronounced over normal temperature ranges. Temperature variation of the insertion loss of crystal filters almost vanishes when the sum of the crystal resistance and the resistance of the compensation circuit remains constant over the temperature range. The use of a thermistor without a parallel resistor provides an unsatisfactory compensation, because the resistance of a thermistor increases so fast at low temperatures that the filter would not operate if the temperature went very much lower than the lowest temperature anticipated. Furthermore, the thermistor characteristic is not only non-linear but also the second derivative is the wrong sign, positive. The second derivative is always positive, because the small-signal resistance of thermistor 11 is as follows:

$$R = Roe^{B/T}$$

where R*o* and B are constants which depend on the thermistor material, and T is absolute temperature.

$$\frac{dR}{dT} = \frac{-RoB}{T^2} e^{B/T}$$

The first derivative of the thermistor characteristic is therefore always negative, as desired.

$$\frac{d^2R}{dT^2} = Roe^{B/T}\left(\frac{B^2}{T^4} + \frac{2B}{T^3}\right)$$

The second derivative is therefore always positive, but for crystal compensation it should be zero, or small and negative as the characteristic curve of the crystal should complement the curve for the thermistor.

Figure 5A:
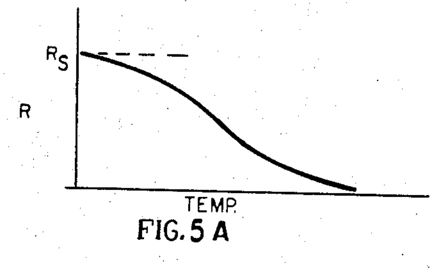
FIG. 5A is a graph of the resistance of the resistor-thermistor combination versus temperature.
Figure 5B:
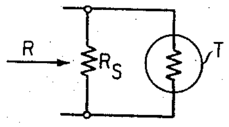
FIG. 5B is a schematic diagram of the resistor-thermistor combination.

It can be seen from the graph in FIG. 5A of the resistor-thermistor combination versus temperature that for a given thermistor-resistor combination, as shown in FIG. 5B, there must exist a temperature below which the second derivative has the desired negative sign, and that in the neighborhood of this inflection point, the characteristic must be almost linear. This is true because, for very low temperatures, the resistance of the network must asymptotically approach the value of the resistor, while for very high temperature it must approach zero.

Operation near and slightly to the left of the inflection point is mandatory for good compensation of crystals. If the crystal characteristic is essentially linear, the inflection point should lie at the center of the operating temperature range.

The resistance of the parallel combination of resistor and thermistor is given by the following:

$$R=\frac{RsRoe^{B/T}}{Rs+Roe^{B/T}}$$

Introducing the normalized temperature variable $$X=T/B$$

and the substitution $A=Rs/Ro$ gives the following ratio:

$$\frac{R}{Rs}=\frac{1}{1+Ae^{-1/x}}$$

Therefore, this expression can be differentiated with respects to $x$ as follows:

$$\frac{d}{dx}\left(\frac{R}{Rs}\right)=\frac{-Ae^{-1/x}}{x^2(1+Ae^{-1/x})^2}$$

$$\frac{d^2}{dx^2}\left(\frac{R}{Rs}\right)=-A\left[\frac{2x+e^{-1/x}(2Ax-2A+1)+Ae^{-2/x}}{x^4(1+Ae^{-1/x})^3}\right]e^{-1/x}$$

The location of the inflection point for various values of A can be found by equating the second derivative to zero and solving for the corresponding value of X. This value of X and its matching value of A can be substituted to find a corresponding value of $$\frac{d}{dx}\left(\frac{R}{Rs}\right)$$

These computations can be performed on a computer. The results of these computations are summarized on the graphs of FIGS. 6A, 6B, 7A, and 7B which are plotted over the range of X corresponding to $2500<B<4200°$ K. and $250°$ K.$<T<350°$ K. These curves are used to determine the slope of the crystal characteristic $-dR/dT$. Furthermore, X can be found from the value of B given by the thermistor manufacturer and from the temperature at the center of the range over which compensation is desired. If the crystal characteristic is somewhat nonlinear, a temperature is chosen near the high end of the compensation range.

Figure 6A:
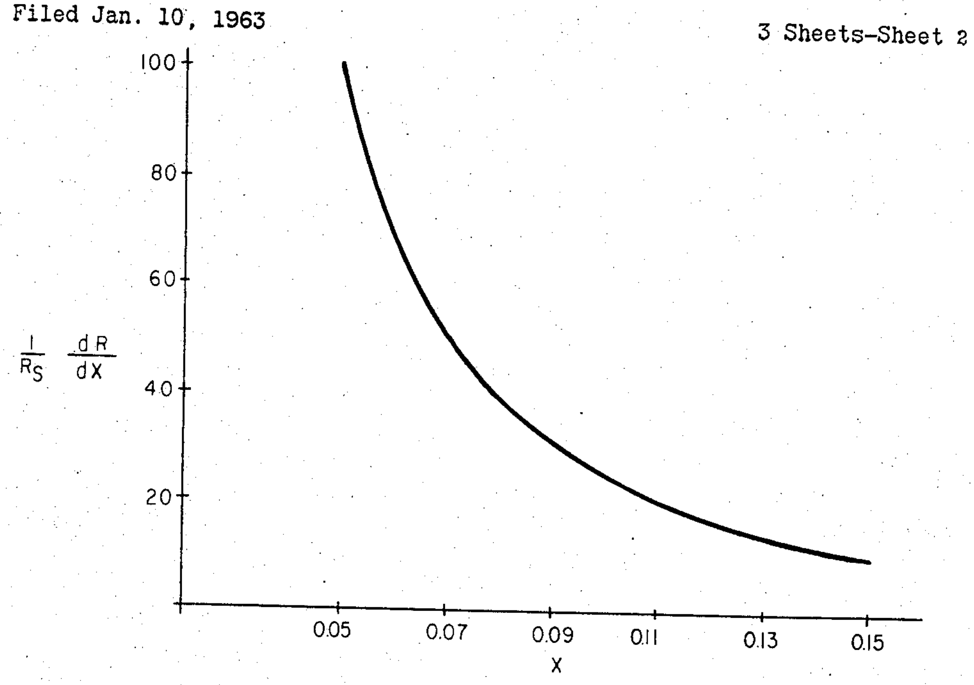
Figure 6B:
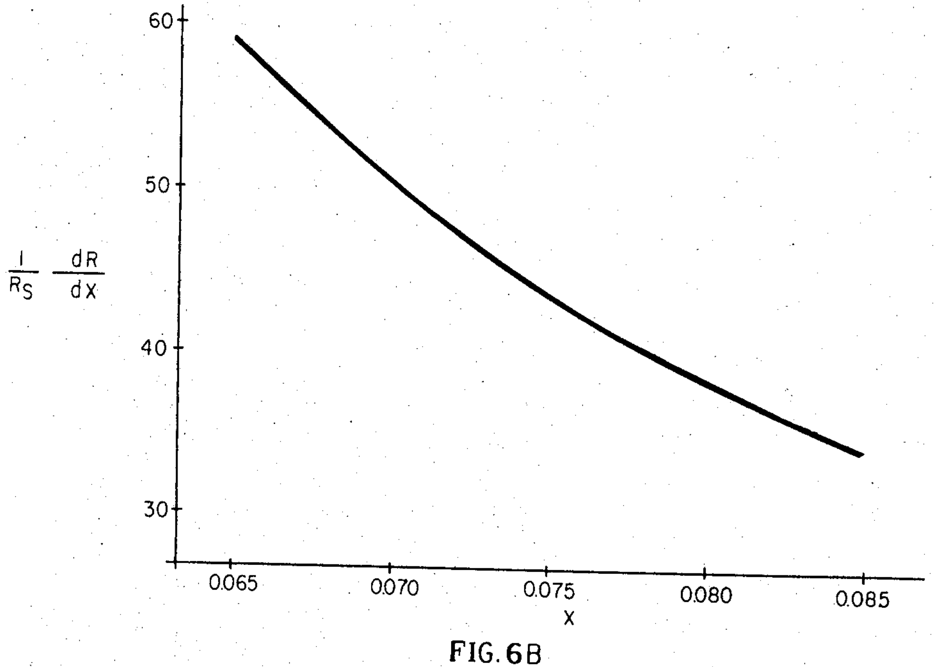

With this value of X, A can be determined from FIG. 6A or FIG. 6B, which are graphs of the quantity.

$$\frac{1}{Rs}\frac{dR}{dX}$$

versus X with FIG. 6B showing an expanded scale for most common values of X, because of the following relationship:

$$-\frac{1}{Rs}\frac{dR}{dx}=A$$

$$dx=dT/B$$

$$-\frac{1}{Rs}\frac{dR}{dx}=-\frac{B}{Rs}\frac{dR}{dT}=A$$

Therefore R$s$, the value of the shunt resistor, can be determined as a result of the following:

$$Rs=\frac{B}{A}\frac{dR}{dT}$$

Figure 7A:
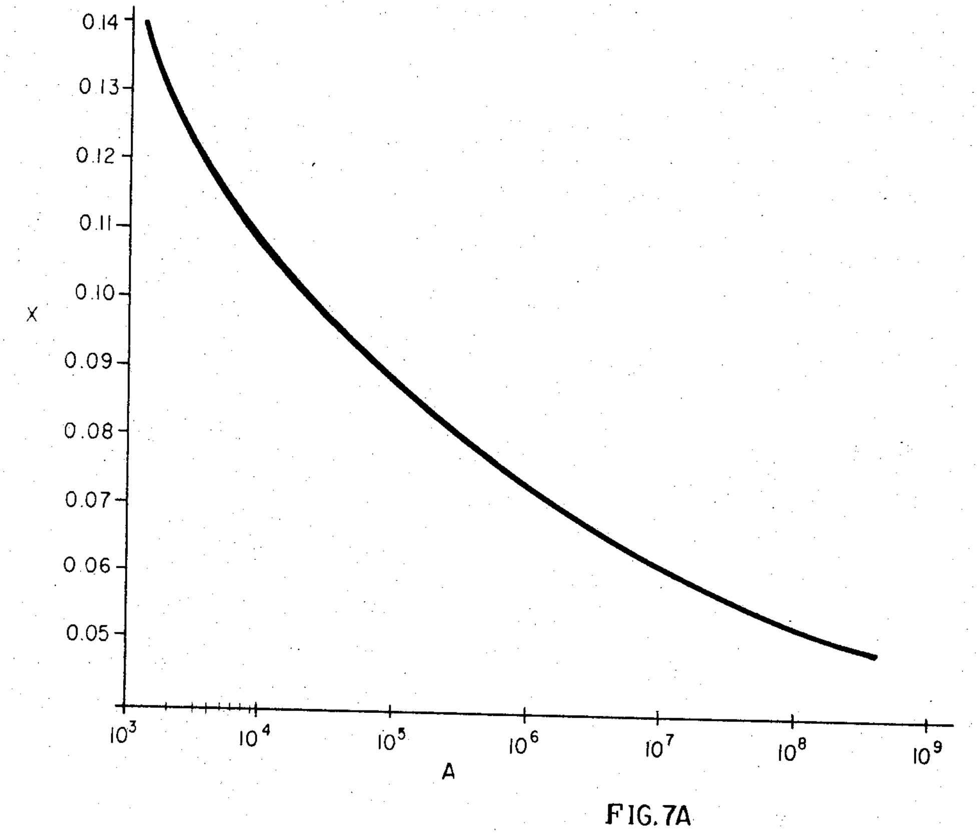
Figure 7B:
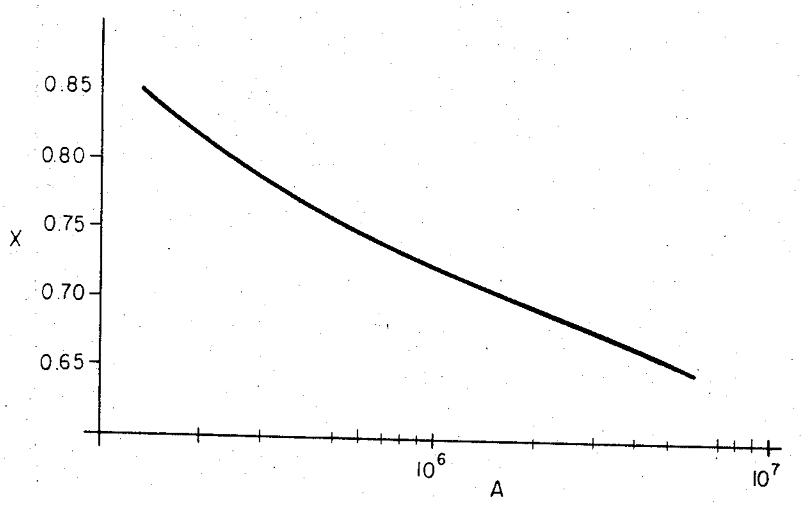

Since X was previously determined, the value of A can be found from the graph in FIG. 7A or FIG. 7B which are graphs of X versus A with FIG. 7B showing an expanded scale for most common values of X. The value of R$o$ can be determined from the following relation:

$$A=Rs/Ro$$

R$o$ is converted to a specification for the thermistor by means of catalogs provided by the various thermistor manufacturers.

The components of the compensation network are now completely specified. Following the above procedure results in a compensation network which has the maximum possible linearity about a given temperature for a given slope.

Note, however, that the magnitude of the sum of the crystal and network resistances can not be specified in advance. Various values of B can be tried if it is desired to vary the total resistance.

What is claimed is:

1. An arrangement for temperature stabilizing over a predetermined temperature range the insertion loss of a quartz crystal filter which is connected in an alternating current circuit extending from an alternating current source to a load, and has a predetermined frequency pass band and the resistance of which varies substantially with temperature over said range, said arrangement comprising:
   circuit means including a thermistor physically interposed in series with said crystal in said alternating current circuit, said circuit means having a resistance-temperature characteristic substantially complementary to that of said crystal such that upon a change in temperature the resistance of said circuit means changes inversely by an amount substantially equal to the amount of change in resistance of said crystal, thereby keeping the effective resistance of the series combination of said circuit means and said crystal, and hence the insertion loss thereof, substantially constant over said temperature range within said frequency pass band.

2. A filter circuit as claimed in claim 1, wherein said circuit means comprises a resistor in parallel connection with said thermistor.

3. A filter circuit as claimed in claim 1, and further comprising an adjustable capacitor connected in shunt relation to said crystal to provide a means for tuning said filter.

4. An arrangement comprising two filter circuits as claimed in claim 3 and also comprising a transformer having a center-tapped secondary winding, the output ends of the two filter circuits being connected together, and the input ends being connected to said secondary winding.

5. An arrangement as claimed in claim 4, further including capacitive means connected across said secondary winding, and resistance means interposed between the output terminal of said arrangement and the point at which said output ends are connected together.

References Cited

UNITED STATES PATENTS

| | | | |
|---|---|---|---|
| 1,959,429 | 5/1934 | Hovgaard | 333—72 |
| 2,286,437 | 6/1942 | Odell | 333—72 |
| 2,330,499 | 9/1943 | Lehfeldt | 333—72 |
| 2,611,873 | 9/1952 | Gager | 333—72 |
| 2,641,741 | 6/1953 | Peterson | 333—72 |
| 2,775,699 | 12/1956 | Felch | 333—72 |
| 3,054,966 | 9/1962 | Etherington | 331—116 |

HERMAN KARL SAALBACH, *Primary Examiner.*

ELI LIEBERMAN, *Examiner.*

C. BARAFF, *Assistant Examiner.*